US009098046B2

(12) United States Patent
Yasukawa

(10) Patent No.: US 9,098,046 B2
(45) Date of Patent: Aug. 4, 2015

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Takuma Yasukawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/297,099

(22) Filed: Jun. 5, 2014

(65) Prior Publication Data

US 2014/0369731 A1    Dec. 18, 2014

(30) Foreign Application Priority Data

Jun. 18, 2013  (JP) .................................. 2013-127237

(51) Int. Cl.
*G03G 15/00* (2006.01)
*B65H 37/04* (2006.01)
*G03G 21/00* (2006.01)
*G06F 3/12* (2006.01)

(52) U.S. Cl.
CPC ............ *G03G 15/6582* (2013.01); *G03G 15/50* (2013.01); *G03G 15/6538* (2013.01); *G06F 3/12* (2013.01); *G03G 15/6547* (2013.01); *G03G 2215/00827* (2013.01)

(58) Field of Classification Search
CPC .................. G03G 15/00; G03G 21/00; G03G 2215/00827; G03G 15/6541; G03G 15/6582; G03G 15/6538; G03G 15/50; B65H 37/04

USPC .................................................. 399/407, 408
See application file for complete search history.

(56) References Cited

U.S. PATENT DOCUMENTS

| | | | | |
|---|---|---|---|---|
| 5,094,379 | A | * | 3/1992 | Hoyer et al. .................... 227/2 |
| 5,639,080 | A | * | 6/1997 | Evans ....................... 270/58.28 |
| 2005/0151985 | A1* | | 7/2005 | Hisamura .................... 358/1.12 |
| 2007/0279646 | A1* | | 12/2007 | Sugimoto et al. ............. 358/1.1 |
| 2008/0170262 | A1* | | 7/2008 | Takahashi .................... 358/1.15 |
| 2012/0082497 | A1* | | 4/2012 | Nagasaki ..................... 399/410 |
| 2012/0269600 | A1* | | 10/2012 | Kozuka ......................... 412/33 |
| 2014/0160506 | A1* | | 6/2014 | Miyajima .................... 358/1.13 |
| 2014/0362396 | A1* | | 12/2014 | Ishizuka ..................... 358/1.13 |

FOREIGN PATENT DOCUMENTS

| | | | | | |
|---|---|---|---|---|---|
| JP | 63139874 A | * | 6/1988 | ............ | B65H 37/04 |
| JP | 63139875 A | * | 6/1988 | ............ | G03G 15/00 |
| JP | 01236167 A | * | 9/1989 | ............ | B65H 37/04 |

(Continued)

*Primary Examiner* — Nguyen Ha
(74) *Attorney, Agent, or Firm* — Fitzpatrick, Cella, Harper & Scinto

(57) ABSTRACT

The present invention aims to shift a printing apparatus to a job processable state by releasing a manual stapling mode in response to an execution instruction of a predetermined job requested by a user. To achieve this, a control method of the printing apparatus comprises: printing an image on a sheet by executing a job; transporting the sheet on which the image was printed, to a post-processing apparatus; causing the post-processing apparatus to perform a post-process; shifting the printing apparatus to a mode of permitting to perform the post-process to the sheet inserted by a user; and controlling, in a case where an execution request of the job is newly accepted, to release the mode according to a kind of the job.

8 Claims, 5 Drawing Sheets

(56) References Cited

FOREIGN PATENT DOCUMENTS

| JP | 02232666 | A | * | 9/1990 | ............ | G03G 15/00 |
| JP | 2005008308 | A | * | 1/2005 | ............ | B65H 37/04 |
| JP | 2005-107322 | | | 4/2005 | | |
| JP | 2005-206298 | | | 8/2005 | | |

* cited by examiner

PRINTING APPARATUS, CONTROL METHOD OF PRINTING APPARATUS, AND STORAGE MEDIUM

BACKGROUND OF THE INVENTION

1. Field of the Invention

The present invention relates to a printing apparatus, a control method of the printing apparatus, and a storage medium storing a program to perform the control method.

2. Description of the Related Art

Conventionally, there is a printing apparatus which is equipped with a post-processing apparatus of performing a post-process such as stapling or the like. Here, the printing apparatus like this generally has such a constitution that sheets (recording papers) on which images were printed respectively are transported one by one by the printing apparatus itself to the post-processing apparatus, the transported sheets are stacked on the tray of the post-processing apparatus, and then the post-process is performed to the stacked sheets.

Besides, Japanese Patent Application Laid-Open No. 2005-206298 describes a printing apparatus which performs stapling to sheets inserted by a user to a process tray of a post-processing apparatus. It should be noted that such a function of the printing apparatus is called a manual stapling function.

Incidentally, as a timing of executing the manual stapling function, it is possible to set a timing when the sheet is detected by a paper-sheaf detection sensor, instead of a timing when a stapling button is depressed. For example, Japanese Patent Application Laid-Open No. 2005-107322 describes a printing apparatus which prepares, as a timing of executing the manual stapling function, two timings, i.e., one is a timing when a sheet is detected by a paper-sheaf detection sensor and the other is a timing when a stapling button is depressed, and can change over these two timings.

The use of the manual stapling function resultingly occupies the post-processing apparatus. Therefore, when the sheet on which the image was printed by the printing apparatus is transported to the post-processing apparatus while the operation in a manual stapling mode is being performed, the transported sheet collides with the sheaf of sheets to which the manual stapling is performed, and thus a jam occurs in the post-processing apparatus. To prevent such inconvenience, a process of inhibiting the printing by the printing apparatus while the manual stapling function is being used (i.e., in the manual stapling mode) is necessary. Moreover, a process of not permitting the use of the manual stapling function (i.e., not permitting to shift to the manual stapling mode) during the printing by the printing apparatus is necessary.

In case of inhibiting the printing in the manual stapling mode, there is a possibility that the printing is not performed indefinitely if a user forgets releasing the manual stapling mode. In particular, since the printing apparatus which has been installed in an office is usually shared by a plurality of users, there is a possibility that the user who uses the manual stapling function is different from the user who wishes to perform the printing by the relevant printing apparatus. In such a case, if the user who used the manual stapling function forgets releasing the manual stapling mode, other users who wish to perform the printing cannot actually perform the printing indefinitely.

SUMMARY OF THE INVENTION

The present invention has been completed in consideration of such a problem as described above, and an object of the present invention is to provide a printing apparatus which is characterized by comprising: a printing unit configured to print an image on a sheet by executing a job; a transportation unit configured to transport the sheet on which the image was printed by the printing unit, to a post-processing apparatus; a post-processing unit configured to cause the post-processing apparatus to perform a post-process; a shift unit configured to shift the printing apparatus to a mode of permitting the post-processing unit to perform the post-process to the sheet inserted by a user; and a control unit configured to, in a case where an execution request of the job is newly accepted, control to release the mode according to a kind of the job.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

Description of System Configuration

First Embodiment

Figure 1:
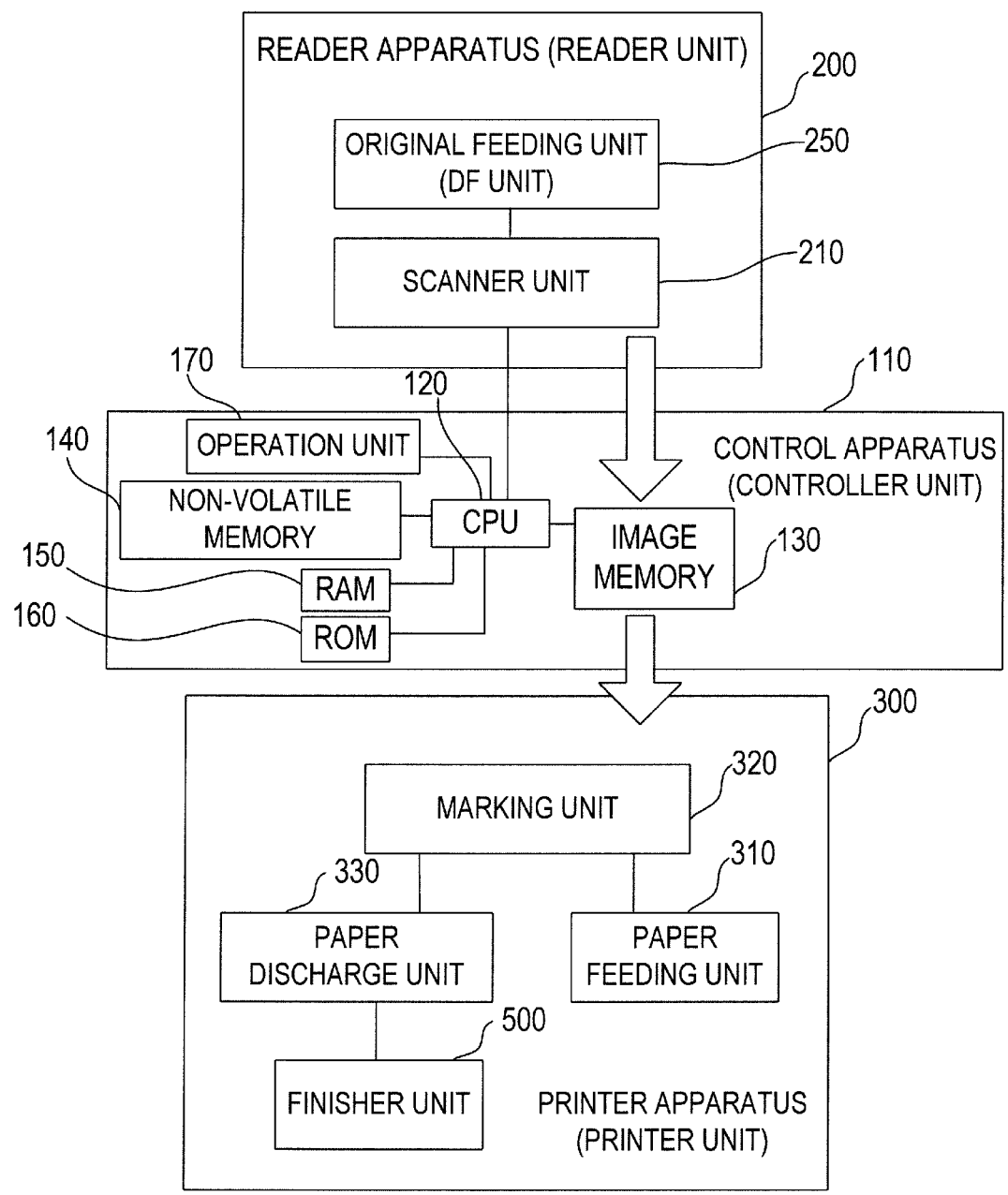
FIG. 1 is a block diagram for describing a configuration of an image input/output system to which a printing apparatus according to the present invention is applied.

FIG. 1 is a block diagram for describing a configuration of an image input/output system to which a printing apparatus according to the embodiment of the present invention is applied. A system in the present embodiment is constituted so as to be able to execute a copy job, a printing job or the like as a job process of processing an accepted job. In case of shifting the system to a manual stapling mode as described later, it is controlled that a printing job is not started even if the relevant printing job is received from an information processing apparatus during the manual stapling mode.

In FIG. 1, a reader unit (image input apparatus) 200 optically reads an original image and thus generates image data. The reader unit 200 is constituted by a scanner unit 210 having a function used for reading an original and an original feeding unit (DF (document feeding) unit) 250 having a function used for transporting originals.

A printer unit (image output apparatus) 300 transports a recording paper (sheet), prints image data on the transported sheet as a visible image, and discharges the image-printed paper to the outside of the printer apparatus. The printer unit 300 is constituted by a paper feeding unit 310 having a plurality kinds of recording paper cassettes, and a marking unit 320 having a function of transferring image data onto the recording paper and fixing the transferred image data as an image. Further, the printer unit 300 is constituted by a paper discharge unit 330 having a function of discharging the print-processed recording paper to the outside of the apparatus, and a post-processing unit (finisher unit) 500 which performs a stapling process and a sorting process. A control apparatus 110 is constituted by a CPU (central processing unit) 120, an image memory 130, a non-volatile memory 140, a RAM (random access memory) 150, a ROM (read only memory) 160 and an operation unit 170.

The control apparatus 110 is electrically connected to the reader unit 200 and the printer unit 300. The CPU 120 in the control apparatus 110 controls the reader unit 200 to read image data of an original into the image memory 130, and further controls the printer unit 300 to output the image data in the image memory 130 onto the recording paper, thereby providing a copy function. Further, various adjustment values are stored in the non-volatile memory 140, the RAM 150 is used as a working area of the CPU 120, and a control program for the CPU 120 is stored in the ROM 160.

The operation unit 170 is equipped with a liquid crystal display unit, a touch panel input device attached on the liquid crystal display unit, and a plurality of hard keys. A signal, which was input by use of the touch panel or the hard keys, is transferred to the CPU 120, and the function in an operation of the printing apparatus, image data and the like are displayed on the liquid crystal display unit. A start button 607 of the operation unit 170 is used as a means of accepting a predetermined job in the course of a post-process for a sheet.

Figure 2:
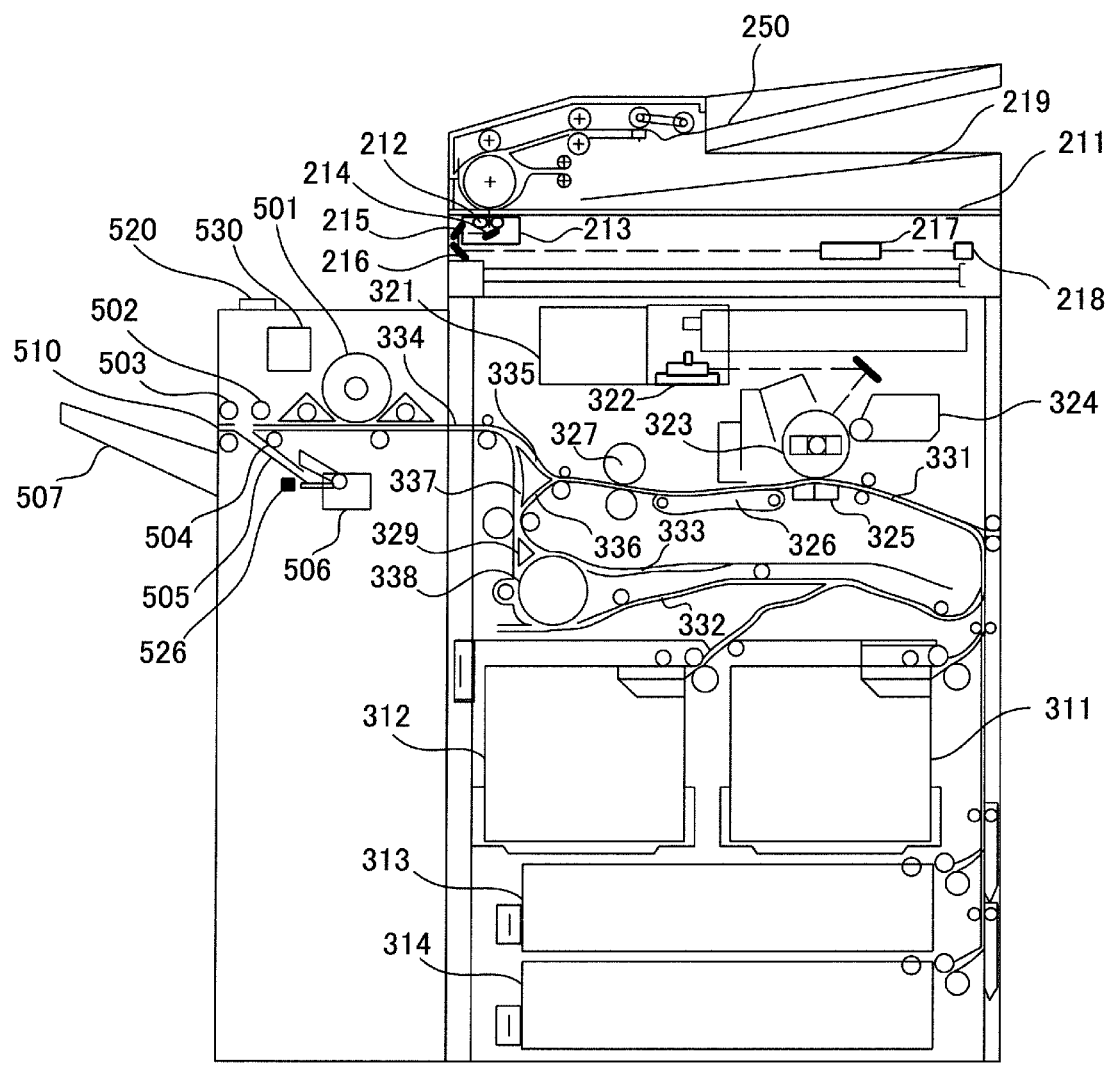
FIG. 2 is a cross-section diagram of the reader unit and the printer unit both illustrated in FIG. 1.

FIG. 2 is a cross-section diagram of the reader unit 200 and the printer unit 300 both illustrated in FIG. 1.

First, the reader unit 200 will be described.

In the reader unit 200, the original feeding unit (feeder) 250 feeds originals one by one onto a platen glass 211 in order from the head, and discharges the originals on the platen glass 211 to a paper discharge tray 219 after completing the reading operation of the originals.

When the original is transported on the platen glass 211, a lamp 212 is lit and an optical unit 213 is started to move so that the original is exposed and scanned. Reflected light from the original at this time is guided to a CCD (charge-coupled device) image sensor (simply called a CCD, hereinafter) 218 by mirrors 214, 215 and 216 and a lens 217. In this manner, the image of the scanned original is read by the CCD 218. Then, the image data to be output from the CCD 218 is subjected to a predetermined process and then transferred to the control apparatus 110.

Next, the printer unit 300 will be described.

In the printer unit 300, a laser driver 321, which drives a laser beam generation unit 322, causes the laser beam generation unit 322 to generate a laser beam corresponding to the image data output from the control apparatus 110. This laser beam is irradiated to a photosensitive drum 323, and a latent image corresponding to the laser beam is formed on the photosensitive drum 323. A developing agent is applied to the portion of the photosensitive drum 323 corresponding to the formed latent image by a developing unit 324.

Moreover, the printer unit 300 has, as the paper feeding unit 310, cassettes 311, 312, 313 and 314 respectively having drawer-like shapes. The respective paper feeding cassettes are drawn out, and papers are fed to the respective cassettes and then the respective cassettes are closed, thereby performing the paper feeding.

In the printer unit 300, a recording paper is fed from any of the cassettes 311, 312, 313 and 314 and transported to a transfer unit 325 through a transportation path 331. At the transfer unit 325, the developing agent applied to the photosensitive drum 323 is transferred to the recording paper. The recording paper, on which the developing agent has been deposited, is transported to a fixing unit 327 by a transportation belt 326, and the developing agent is fixed on the recording paper by heat and pressure of the fixing unit 327. Thereafter, the recording paper, which passed the fixing unit 327, is discharged through transportation paths 335 and 334. Alternatively, when discharging the recording paper after reversing the print-processed surface, the recording paper is guided to transportation paths 336 and 338, where the recording paper is transported to the reverse direction. Then, the recording paper is transported through a transportation path 337 and the transportation path 334.

In a case where two-sided recording is set, the recording paper is guided to a transportation path 333 from the transportation path 336 by means of a flapper 329 after passing the fixing unit 327, thereafter, the recording paper is transported to the reverse direction and guided to the transportation path 338 and a paper re-feeding transportation path 332 by means of the flapper 329. The recording paper guided to the paper re-feeding transportation path 332 passes through the transportation path 331 with the above timing to be fed to the transfer unit 325. In spite of the one-sided or two-sided recording, the recording paper discharged from the transportation path 334 is transported to the post-processing unit 500.

The transported recording paper is first carried to a buffer unit 501, where the transported recording paper is coiled around the buffer roller for a buffering operation according to a circumstance. For example, in a case where a stapling process or the like to be performed at the downstream side takes much time, transportation speed of the recording paper, which is transported from the main body of the apparatus, can be kept constant by utilizing the buffer unit, and it will be thus possible to become useful for improvement of throughput. Thereafter, the recording paper is discharged to a paper discharge tray 507 through a paper discharge port 510 by a pair of upstream paper discharge rollers 502 and a pair of downstream paper discharge rollers 503. In case of a stapling mode, the recording paper is pulled back by a roulette belt 504 just after the recording paper was transported by the pair of upstream paper discharge rollers 502 and the trailing edge of the recording paper passed through the pair of the rollers, and the recording paper is then discharged to a stack tray 505.

Then, after that the predetermined number of recording papers were stacked, the stacked recording papers are subjected to a stapling process by a stapling unit 506, and then the processed recording papers are discharged to the paper discharge tray 507 by the pair of downstream paper discharge rollers 503. In case of performing shift sorting, the recording papers stacked on the stack tray are displaced to right and left and discharged to the paper discharge 507, thereby showing differences of the respective sheaves of recording papers.

In the normal stapling, a stapling process is performed after the recording papers discharged from the transportation path 334 were stacked on the stack tray 505. Separately from that stapling process, there is the manual stapling mode as previously described, in which a user insets a sheaf of papers in the stack tray 505 and when a paper sheaf detecting sensor 526 detects the sheaf of papers, a stapling process is performed for the sheaf of papers in the stack tray 505 by the stapling unit 506. That is, the manual stapling mode is such a mode of performing the stapling process to the sheets (papers) without performing image printing by the transfer unit 325 and the fixing unit 327. The printing apparatus shifts to the manual stapling mode by using a manual stapling mode button 520. The manual stapling mode button 520 is used as a unit for giving an instruction of stopping a job of the job processing unit and performing a post-process for the sheets to be inserted by the user.

Figure 3:
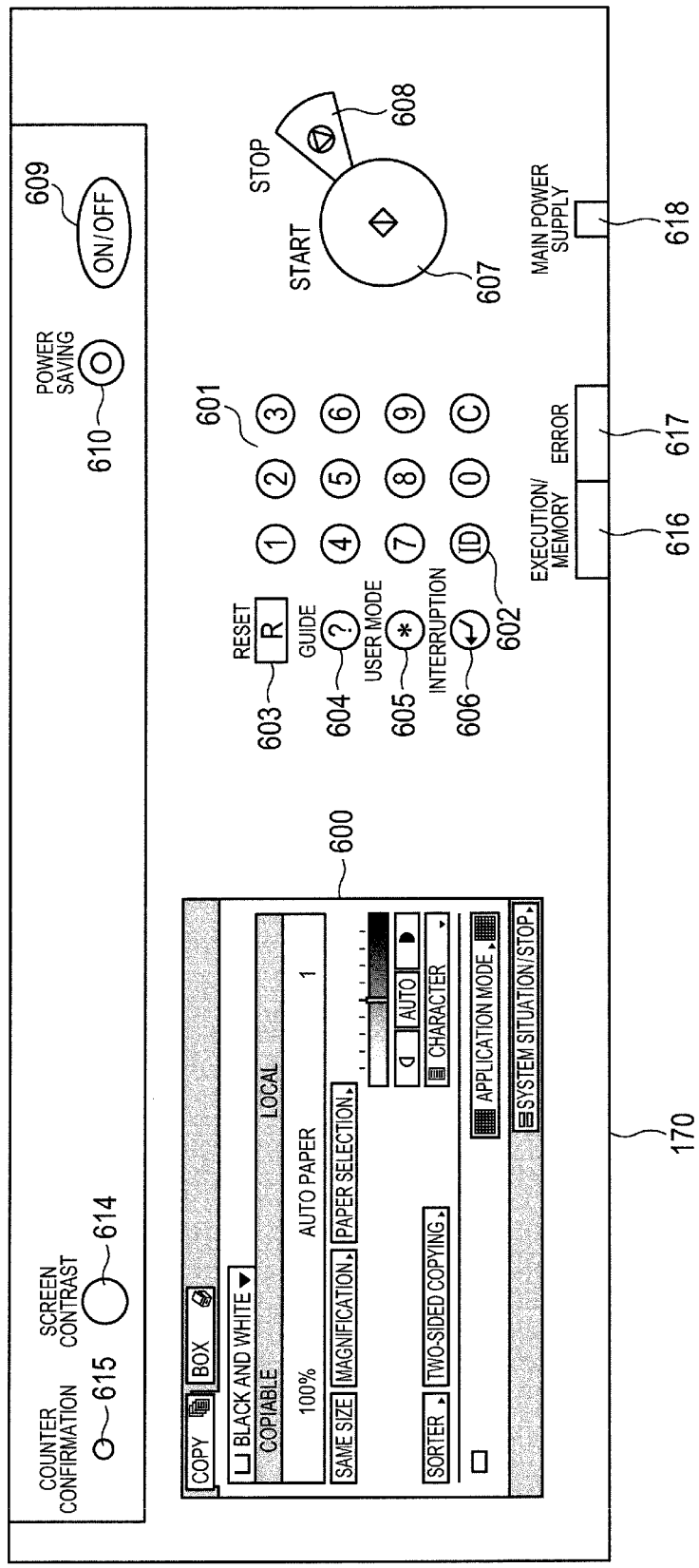
FIG. 3 is a plan view for describing a configuration of the operation unit illustrated in FIG. 1.

FIG. 3 is a plan view for describing a configuration of the control unit 170 illustrated in FIG. 1.

In FIG. 3, main mode setting and state displaying are performed on an LCD (liquid crystal display) touch panel 600. A numerical keypad 601 is used for inputting numerical values of 0 to 9. An ID (identification) key 602 is used for inputting a section number and a password mode in a case where the apparatus is managed by a section.

A reset key 603 is used for resetting the set mode, a guide key 604 is used for displaying an explanation screen for each mode, a user mode key 605 is used for entering into a user mode screen, and an interruption key 606 is used for interruption copying. Further, a start key 607 is used for starting a copying operation, and a stop key 608 is used for stopping the copy job being executed.

The back light of the LCD 600 is gone out and the apparatus shifts to a low power state by depression of a soft power supply SW 609. The apparatus shifts to a power saving state by depression of a power saving key 610, and the apparatus is recovered from the power saving state by re-depression of the power saving key 610.

An adjustment key 614 is used for adjusting contrast of the LCD touch panel. A count screen, which displays the sum of the number of copies ever used, is displayed on the LCD by depression of a counter confirmation key 615.

An LED (light-emitting diode) 616 indicates a state of accumulating images in an image memory during a job, an error LED 617 indicates that the apparatus is in an error state such as a jamming state, a door-opened state or the like, and a power supply LED 618 indicates that the main switch of the apparatus is being on.

In a case where the control apparatus 110 shifts to a manual stapling mode by depressing the manual stapling mode button 520, the control apparatus 110 displays a message that the apparatus is in the manual stapling mode on the LCD 600. According to this message, a user can confirm that the apparatus shifted to the manual stapling mode.

Figure 4:
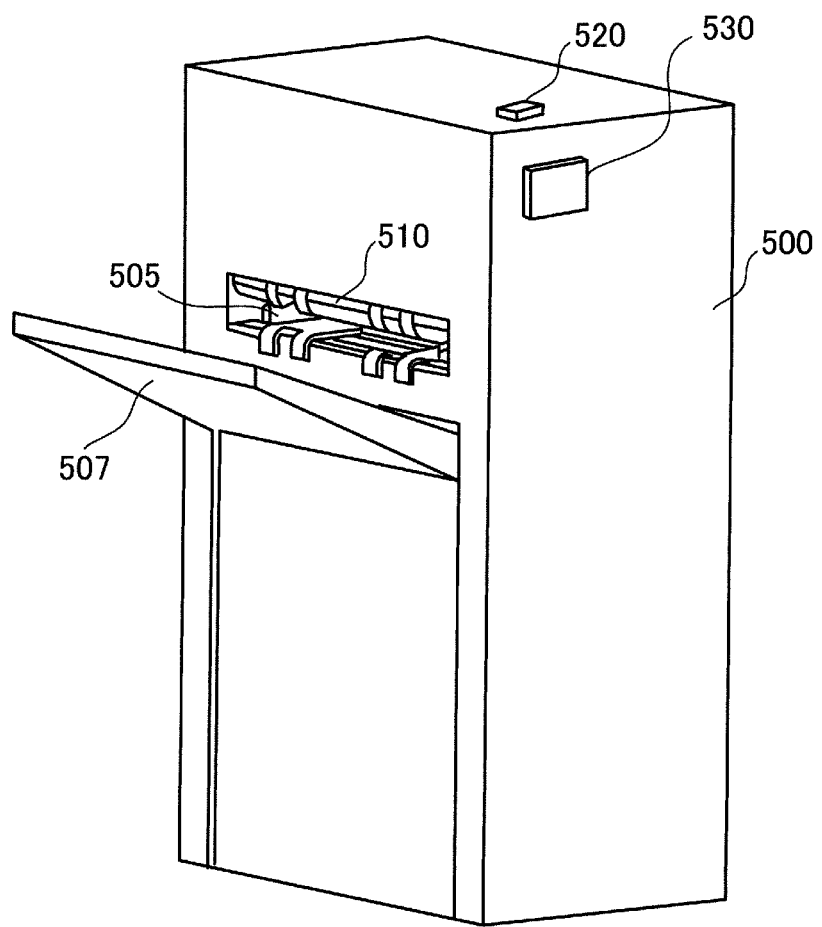
FIG. 4 is a perspective view illustrating an outer appearance of the post-processing unit illustrated in FIG. 1.

FIG. 4 is a perspective view illustrating an outer appearance of the post-processing unit 500 illustrated in FIG. 1. A procedure of performing a manual stapling process will be described with reference to FIG. 4.

First, a user stands in front of the post-processing unit 500 with having a paper sheaf desired to be stapled. Next, the user depresses the manual stapling mode button 520 of the post-processing unit 500. In a case where if the printing apparatus is performing the printing, an instruction of shifting the apparatus to the manual stapling mode caused by depression of the manual stapling mode button 520 is ignored. This is because there is a fear that the printed papers are discharged from the paper discharge port 510 of the post-processing apparatus and these discharged papers collide with a paper sheaf, which is in the manual stapling mode, and a jamming phenomenon occurs in a case where the printing is currently performed. In a case where the printing is not currently performed, the apparatus shifts to the manual stapling mode, and a printing process by the printing apparatus is stopped. Accordingly, the user can occupy the post-processing apparatus 500 for the purpose of performing the manual stapling.

The user inserts the paper sheaf, which is desired to be stapled, into the stack tray 505 from the paper discharge port 510 for the post-processing unit 500 which shifted to the manual stapling mode. The paper sheaf detecting sensor 526, which detects that the paper sheaf was inserted on the stack tray 505, exists inside the post-processing unit 500. When the paper sheaf detecting sensor 526 detects the paper sheaf, a stapling process is performed to the paper sheaf on the stack tray 505 by the stapling unit 506.

Figure 5:
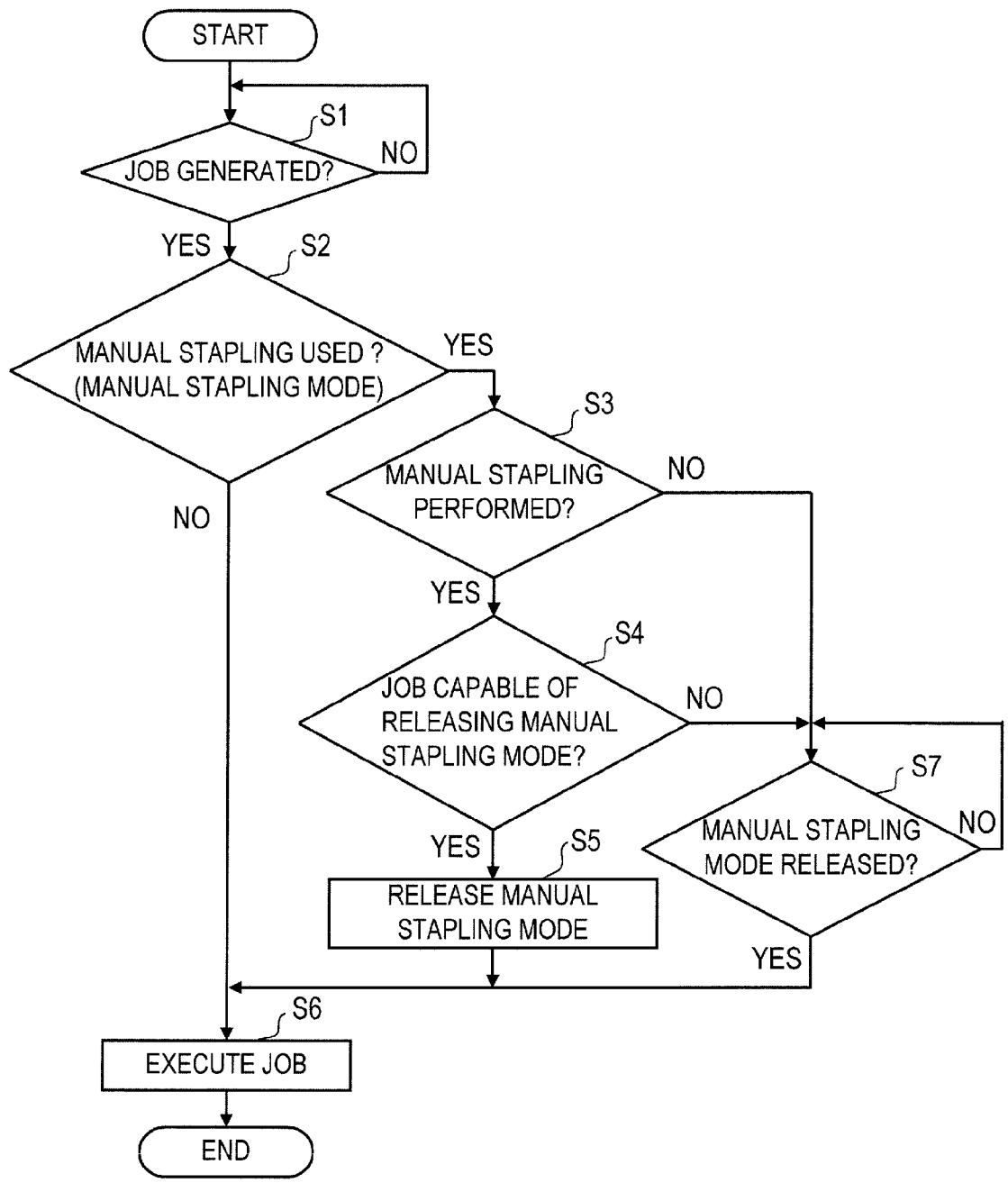
FIG. 5 is a flow chart for describing a control method of the printing apparatus.

FIG. 5 is a flow chart for describing a control method of the printing apparatus indicating the present embodiment. Respective steps are realized by a process that the CPU 120 in the control apparatus 110 executes programs stored in the ROM 160. It is also constituted that the control apparatus 110 receives a printing job or the like from an information processing apparatus (not illustrated) and enables the RAM 150 to store information of the printing job or the like. In addition, it is also constituted that the user operates the operation unit 170 and enables the apparatus to execute the copy job. Hereinafter, a control, which urges to start the accepted printing job by releasing an instruction of the manual stapling mode in accordance with an operation of determining whether or not the post-processing unit performs a post-process to the sheet in accordance with an operation of accepting a predetermined job, will be described. As to the kind of job, which is to be accepted, determined in S1 indicated in FIG. 5, it is constituted that a user can previously designate. The present embodiment indicates a case where the kind of designated job is a copy job.

In S1, the CPU 120 of the control apparatus 110 determines whether or not the job was accepted. When the CPU 120 determined that the job was accepted, the flow advances to S2. When the CPU 120 determined that the job was not accepted, an acceptance of the job is confirmed again in S1.

In S2, the CPU 120 determines whether or not the manual stapling mode is currently set. When the CPU 120 determined that it is in the manual stapling state, the flow advances to S3. When the CPU 120 determined that it is not in the manual stapling state, the flow advances to S6.

In S3, the control apparatus 110 determines whether or not the manual stapling is performed at least one time after the apparatus shifted to the manual stapling mode. When the CPU 120 determined that the manual stapling was performed at least one time, the flow advance to S4. When the CPU 120 determined that the manual stapling is not performed, the flow advances to S7.

In S4, the CPU 120 determines whether or not the accepted job is such a kind of job capable of releasing the manual stapling mode. For example, it is assumed that the kind of job is a copy job, where an original is read by the reader unit 200 and an image of the original, which was read, is printed on a sheet by the printer unit 300. In that case, the CPU 120 determines that the accepted job is such a kind of job capable of releasing the manual stapling mode. On the other hand, it is assumed that the kind of job is a printing job, where image data and the printing setting are received from an external apparatus through a network I/F (not illustrated) provided in the printing apparatus and an image is printed on a sheet on the basis of the received image data and the printing setting. In that case, the CPU 120 determines that the accepted job is not such a kind of job capable of releasing the manual stapling mode. A reason for the above-mentioned case will be described. In case of the printing job, the job is often entered from an external apparatus such as a PC located away from the printing apparatus. Therefore, there is a case where the job is entered from the external apparatus without noticing the existence of a user who intends to perform the manual stapling at the printing apparatus. Even in such the case, if the manual stapling mode is released in accordance with acceptance of an execution request of the job, the printing of the accepted job starts, and a user who intends to perform the manual stapling cannot perform the manual stapling. Therefore, in the present embodiment, in a case where the kind of job is a printing job, the CPU 120 determines that the accepted job is not such a kind of job capable of releasing the manual stapling mode.

On the other hand, in case of a copy job, a user operates the operation unit 170 in front of the printing apparatus and enters the job. Therefore, the possibility of not noticing a user who intends to perform the manual stapling is in a low level. That is, the possibility that a user who intends to perform the copy job gets permission from a user who intends to perform the manual stapling is in a high level. Also, it is considered that the user who intends to perform the manual stapling and the user who intends to perform the copy job are the same person. In that case, since the copy job is intended to be performed according to the purpose of the user, the manual stapling mode may be released in accordance with a fact of accepting an execution request of the job. Therefore, in the present embodiment, in a case where the kind of job is a copy job, the CPU 120 determines that the accepted job is such a kind of job capable of releasing the manual stapling mode. Here, when the CPU 120 determined that the accepted job is such a kind of job capable of releasing the manual stapling mode, the flow advances to S5. When the CPU 120 determined that the accepted job is not such a kind of job capable of releasing the manual stapling mode, the flow advances to S7.

In S5, the CPU 120 releases the manual stapling mode, and the flow advances to S6. In S6, the CPU 120 executes the accepted job, for example, a copy job. In S7, the CPU 120 waits for an operation that the manual stapling mode button 520 is depressed again by a user in a state of the manual stapling mode. When the manual stapling mode button 520 is depressed again, the CPU 120 determines that a release instruction of the manual stapling mode has been accepted from the user, and the manual stapling mode is released. When the manual stapling mode is released, the flow advances to S6. In S7, when it is determined that a predetermined time has been elapsed after the apparatus shifted to the manual stapling mode by a timer (not illustrated), the manual stapling mode may also be released.

As mentioned above, in S5, the CPU 120 releases the manual stapling mode in accordance with an execution request of the job even if a release request of the manual stapling mode is not separately accepted from a user by the depression of the manual stapling mode button 520. By constituting in this manner, the printing apparatus can release the manual stapling mode in accordance with the kind of job, and a convenient exclusive operation of the manual stapling mode and a printing mode can be realized for a user.

In S2, when it was determined that it is in the manual stapling mode, a process may be directly advanced to S4 without confirming a practicing situation of the manual stapling in S3. In the above-mentioned embodiment, an example, where it was determined whether or not the manual stapling mode is released depending on a fact that the kind of job is a copy job or a printing job, has been described. However, the kind of job is not limited to this case. For example, the present embodiment may be applied to a case where the kind of job is a fax printing job, where image data is accepted from an external facsimile apparatus and the accepted image data is printed on a sheet by the printer unit 300. In that case, the CPU 120 determines that the accepted job is not such a kind of job capable of releasing the manual stapling mode. A reason for this case is because a job is transmitted from a place away from the printing apparatus regarding image data of a FAX. For example, because there is a case where a user of an external facsimile apparatus enters a job from the external apparatus without noticing existence of a user who intends to perform the manual stapling.

Incidentally, it is also possible to achieve the respective operations of the present invention by causing the processing device (CPU, processor) of the personal computer (computer) or the like to execute the software (program) acquired from the network or the various storage media.

It should be noted that the present invention is not limited to the above embodiments. Namely, various modifications (including organic combinations of the respective embodiments) can be performed based on the purposes of the present invention, and these modifications are not excluded from the scope of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127237, filed Jun. 18, 2013, which is hereby incorporated by reference herein in its entirety.

What is claimed is:

1. A printing apparatus comprising:
   a printing unit configured to print an image on a sheet by executing a job;
   a transportation unit configured to transport the sheet on which the image was printed by the printing unit, to a post-processing apparatus;
   a post-processing unit configured to cause the post-processing apparatus to perform a post-process;
   a shift unit configured to shift the printing apparatus to a mode of permitting the post-processing unit to perform the post-process to the sheet inserted by a user; and
   a control unit configured to, in a case where an execution request of the job is newly accepted, control to release the mode according to a kind of the job.

2. The printing apparatus according to claim 1, wherein the mode includes a mode of permitting the post-processing unit to perform the post-process to the sheet inserted by the user, in a state that the printing of the image by the printing unit is restricted.

3. The printing apparatus according to claim 1, wherein, in a case where the kind of the job includes a copy job, the control unit controls to release the mode.

4. The printing apparatus according to claim 1, wherein, in a case where the kind of the job includes a printing job, the control unit controls not to release the mode.

5. The printing apparatus according to claim 1, wherein, in a case where the kind of the job includes a fax printing job, the control unit controls not to release the mode.

6. The printing apparatus according to claim 1, further comprising a determination unit configured to determine whether or not the post-process is performed at least once to the sheet inserted by the user by means of the post-processing unit in a state that the printing apparatus has shifted to the mode, wherein, in a case where it is not determined by the determination unit that the post-process is performed at least once to the sheet inserted by the user by means of the post-processing unit in the state that the printing apparatus has shifted to the mode, the control unit controls not to release the mode.

7. A control method of a printing apparatus, comprising:
printing an image on a sheet by executing a job;
transporting the sheet on which the image was printed, to a post-processing apparatus;
causing the post-processing apparatus to perform a post-process;
shifting the printing apparatus to a mode of permitting to perform the post-process to the sheet inserted by a user; and
controlling, in a case where an execution request of the job is newly accepted, to release the mode according to a kind of the job.

8. A non-transitory computer-readable storage medium which stores a program to cause a computer to execute a control method of a printing apparatus, the program comprising:
a code to print an image on a sheet by executing a job;
a code to transport the sheet on which the image was printed, to a post-processing apparatus;
a code to cause the post-processing apparatus to perform a post-process;
a code to shift the printing apparatus to a mode of permitting to perform the post-process to the sheet inserted by a user; and
a code to, in a case where an execution request of the job is newly accepted, release the mode according to a kind of the job.

* * * * *